United States Patent
Mushett et al.

(10) Patent No.: US 6,623,793 B2
(45) Date of Patent: Sep. 23, 2003

(54) PROCESS FOR FORMING A REFLECTIVE SURFACE

(75) Inventors: Daniel Mushett, Oak Ridge, TN (US); Randall Craft, Norwalk, OH (US)

(73) Assignee: Litetech, Inc., Oak Ridge, TN (US)

( * ) Notice: Subject to any disclaimer, the term of this patent is extended or adjusted under 35 U.S.C. 154(b) by 0 days.

(21) Appl. No.: 09/933,472

(22) Filed: Aug. 16, 2001

(65) Prior Publication Data

US 2002/0114883 A1 Aug. 22, 2002

Related U.S. Application Data

(60) Provisional application No. 60/225,561, filed on Aug. 16, 2000.

(51) Int. Cl.⁷ ............ B05D 5/06; G02B 5/128
(52) U.S. Cl. ............ 427/163.4; 427/508; 427/510; 427/542; 427/557; 427/558; 427/559; 427/185; 427/195; 427/203; 427/384; 359/536; 359/540; 359/541
(58) Field of Search ............ 427/467, 508, 427/512, 514, 516, 163.4, 185, 189, 195, 510, 521, 542, 553, 557–559, 196, 203, 205, 384, 385.5, 388.2; 239/690, 708; 359/534, 536, 540, 541

(56) References Cited

U.S. PATENT DOCUMENTS

| | | | |
|---|---|---|---|
| 2,043,414 A | | 6/1936 | Korff |
| 4,340,273 A | * | 7/1982 | Jack et al. .......... 359/535 |
| 4,367,919 A | * | 1/1983 | Tung et al. .......... 359/538 |
| 4,564,556 A | | 1/1986 | Lange |
| 4,937,127 A | | 6/1990 | Haenggi et al. |
| 5,053,253 A | | 10/1991 | Haenggi et al. |
| 5,124,178 A | | 6/1992 | Haenggi et al. |
| 5,721,052 A | * | 2/1998 | Muthiah et al. .......... 427/195 |
| 5,736,602 A | * | 4/1998 | Crocker et al. .......... 106/31.04 |
| 5,777,790 A | * | 7/1998 | Nakajima .......... 359/536 |
| 6,247,818 B1 | * | 6/2001 | Hedblom et al. .......... 359/539 |
| 6,276,400 B1 | * | 8/2001 | Jackson et al. .......... 138/137 |
| 6,280,800 B1 | * | 8/2001 | Thiele et al. .......... 427/180 |

FOREIGN PATENT DOCUMENTS

| | | |
|---|---|---|
| GB | 1 202 330 | 8/1970 |
| WO | WO 97/03814 | 2/1997 |
| WO | WO 00/23655 | 4/2000 |

OTHER PUBLICATIONS

International Search Report corresponding to International Application No. PCT/US01/25845.

* cited by examiner

*Primary Examiner*—Shrive P. Beck
*Assistant Examiner*—Wesley Markham
(74) *Attorney, Agent, or Firm*—Pearne & Gordon LLP

(57) ABSTRACT

A process for forming a retroreflective layer on a powder coated substrate is provided. The substrate is powder coated and the powder coating is subsequently partially cured. Reflective elements are then partially embedded in the semi-cured powder. The powder is then fully cured to permanently bond the reflective elements with the powder coating. The resultant retroreflective assembly can be used in any application requiring high detectability in poor visibility conditions, such as road signs and the like.

17 Claims, 1 Drawing Sheet

PROCESS FOR FORMING A REFLECTIVE SURFACE

CONTINUING DATA

The present invention claims the benefit of the filing date of U.S. provisional application Ser. No. 60/225,561, filed on Aug. 16, 2000.

FIELD OF THE INVENTION

The present invention relates to a novel process for forming a retroreflective surface on a substrate using a modified dry powder coating process. More particularly, the present invention relates to a process for applying optical elements and a binder material to a substrate to form a retroreflective surface on road markers, airport runways, or signs and the like using a dry powder coating process.

BACKGROUND OF THE INVENTION

Most highway guidance lines, such as centerlines, edge lines and lane markers, depend upon some sort of light-reflecting device for making them more visible at night when the only source of illumination is the light from the motor vehicle head lamps. Such reflecting devices can be cube corners, glass microspheres, or simply light colored objects protruding above the pavement surface.

A plain white line painted on the surface or even a plain white plastic line adhered to the road surface is not easily visible even at a distance as near as 100 feet because of the extremely shallow angle of the light emanating from vehicle head lamps which impinge upon the road surface. Most of the incidental light is scattered and thus reflected away from the vehicle and very little returns by reflection for the operator to detect. Use of light-reflecting devices such as those mentioned above, incorporated within the painted or other light-colored line, can increase a motorists detection of the line out to many hundreds of feet. For example, the incorporation of transparent glass microspheres, ranging in size from a few thousandths of an inch in diameter to as much as a tenth of an inch, produce a better light reflection through an effect in which the microspheres serve as miniature optical lenses which focus the incident light from the headlamps into a tiny spot located a slight distance behind the rear surface of the microspheres. The focused spot of light falling upon a pigmented material after undergoing scattering is then partially reflected back upon itself and reaches the motorist's eyes by a phenomenon called retroreflection. Because of light scattering by the pigmented binder in which the microspheres are partially embedded, only a small percentage of the incident light is returned by retro-reflection; but even this is considerably more light than is the case of an ordinary painted line. During daylight, the ordinary painted line is easily seen by a motorist for thousands of feet because of the abundance of ambient overhead skylight incident upon the line.

The principle of using glass microspheres as light-reflecting lenses for highway markers was disclosed as early as 1936 in U.S. Pat. No. 2,043,414. Soda-lime-silicate glass, such as window glass with a refractive index of 1.5, is commonly used as the medium for the microspheres because it is relatively inactive chemically and is a very hard material. This glass, forming the microspheres, generally causes the incident light to come to a focus some distance behind the rear surface of the microsphere. An increase in the brightness can result, however, when the light comes to a focus upon the rear surface of the microsphere itself. This occurs when a glass with a higher index of refraction is used. The distance behind the rear surface of a glass microsphere where the incident light comes to a focus is a function of the refractive index of the glass. As the refractive index increases from a value of approximately 1.5, the focus point moves in closer to the rear surface of the microsphere, reaching this surface when a refractive index value of approximately 1.9 is attained. At this point, the majority of the incident light is returned back upon itself in a retro-reflected beam.

If the rear surface of a microsphere is covered with a highly specular light-reflecting metal such as aluminum, chromium, silver or some other specularly reflective material, then the entire incident light beam is returned except for small losses due to absorption and other minor effects, such as spherical aberration. Even without such a reflective coating, however, the returned light beam is considerably brighter than it would be with a lower refractive index glass. This effect is achieved because the scattered light in the focused spot is very near the rear surface of the sphere itself and thus most of it re-enters the sphere and produces a brilliant retroreflected beam.

All known techniques for producing a retroreflective surface on a substrate using reflective elements embedded in a binder utilize conventional coating techniques such as painting, laminating or dipping of the substrate in the binder. Such techniques are relatively expensive, inefficient and generate a large amount of waste and pollution.

Electrostatic powder coating is a technique whereby an electrostatically charged particulate is adhered to an exposed surface of a neutrally charged object. This particulate can comprise any of a number of compounds, including a variety of thermoset and thermoplastic materials. The charged particles adhere to the surface of the object and are subsequently permanently bonded thereto by curing the powder coating using heat or some other method. The resulting coating provides exceptional toughness and impact resistance as well as resistance to environmental and chemical exposure. Fluidized bed powder coating is a technique in which powder particles are dispersed throughout a chamber by low pressure air or other gas. When a preheated substrate is introduced into the chamber, the particles strike the substrate where they melt and cling to its surface. Subsequent curing of the melted particles permanently bonds them to the substrate.

The use of powdered coating techniques for coating and coloring the exposed surfaces of finished articles has increased in recent years, taking the place of traditional painting and dipping techniques. Powder coating techniques offer numerous advantages over conventional coating processes utilizing paint, lacquer or other solvent-based carriers.

A first, and perhaps the most important advantage, is the fact that powder coatings are applied without the use of solvents, thereby greatly reducing the amount of polluting volatile organic compounds released into the atmosphere. This allows the coating industry to meet ever increasingly strict environmental regulations and worker safety concerns easily and inexpensively. This aspect of powder coating, along with the fact that excess powder spray can be collected for reuse, also reduces the cost of disposal of potentially hazardous and flammable waste.

Thus, because powder coating provides many advantages over traditional coating techniques, a need exists for a method of producing retroreflective surfaces on a substrate utilizing reflective elements in a powder coating process.

SUMMARY OF THE INVENTION

The process of the present invention involves coating a substrate or material with both a powder coating material and a retroreflective material. The powder coating material provides a tough, corrosion resistant protective layer on the substrate and also acts as a binder in which the retroreflective material is subsequently embedded. The powder coating process of the present invention includes the following steps:

1. Pre-treatment of the substrate
2. Drying of the substrate
3. Powder coating
4. Semi-cure the powder coating
5. Apply retroreflective layer
6. Finish cure powder coating
7. Apply clear coat or translucent composition (optional step)

Pretreatment of the substrate is typically necessary to ensure that the powder coating will adhere to the substrate. This pretreatment, which generally includes the steps of cleaning and conversion coating, helps to remove dirt, grease and oil from the substrate, as well as providing improved adhesion and corrosion resistance. After the substrate is dried, a powder coating is applied to its surface by one of several methods, such as electrostatic spray or fluidized bed treatment. Any of the various known powder coatings can be used in the powder coating process according to the present invention. Typical powders useable in the powder coating process include, but are not limited to, epoxy compounds, polyesters, acrylics, polyester urethanes, acrylic epoxies and various hybrids and combinations thereof. Partial curing of the powder coating is accomplished by conventional methods such as oven curing or curing with infrared radiation. This partially cured powder acts as a binder in which reflective elements can be subsequently embedded. The partial curing step comprises approximately 75% of the total cure time or to the gel point of the powder.

After the powder coating is partially cured, a retroreflective layer is applied to the substrate on top of the partially cured powder. The retroreflective layer is comprised of a reflective material. Suitable reflective materials for the retroreflective layer include glasses, ceramics, metal flakes, plastics and other reflective materials known in the art. The reflective material can be in the form of small beads or chips, collectively known as reflective elements, and can be applied in any conventional manner, such as fluidized bed or sprayed on methods. Suitable reflective elements in the present invention include ceramic or glass beads or microspheres. Typical of these include beads made from soda-lime-silicate glasses (also known as barium titanate glass beads).

After the reflective material is applied to the powder-coated substrate, the powder is fully cured to intimately bond the reflective material to the cured powder layer. An optional clear coat or translucent composition may subsequently be added to provide additional protection and adhesion.

DETAILED DESCRIPTION OF THE INVENTION

Figure 1:
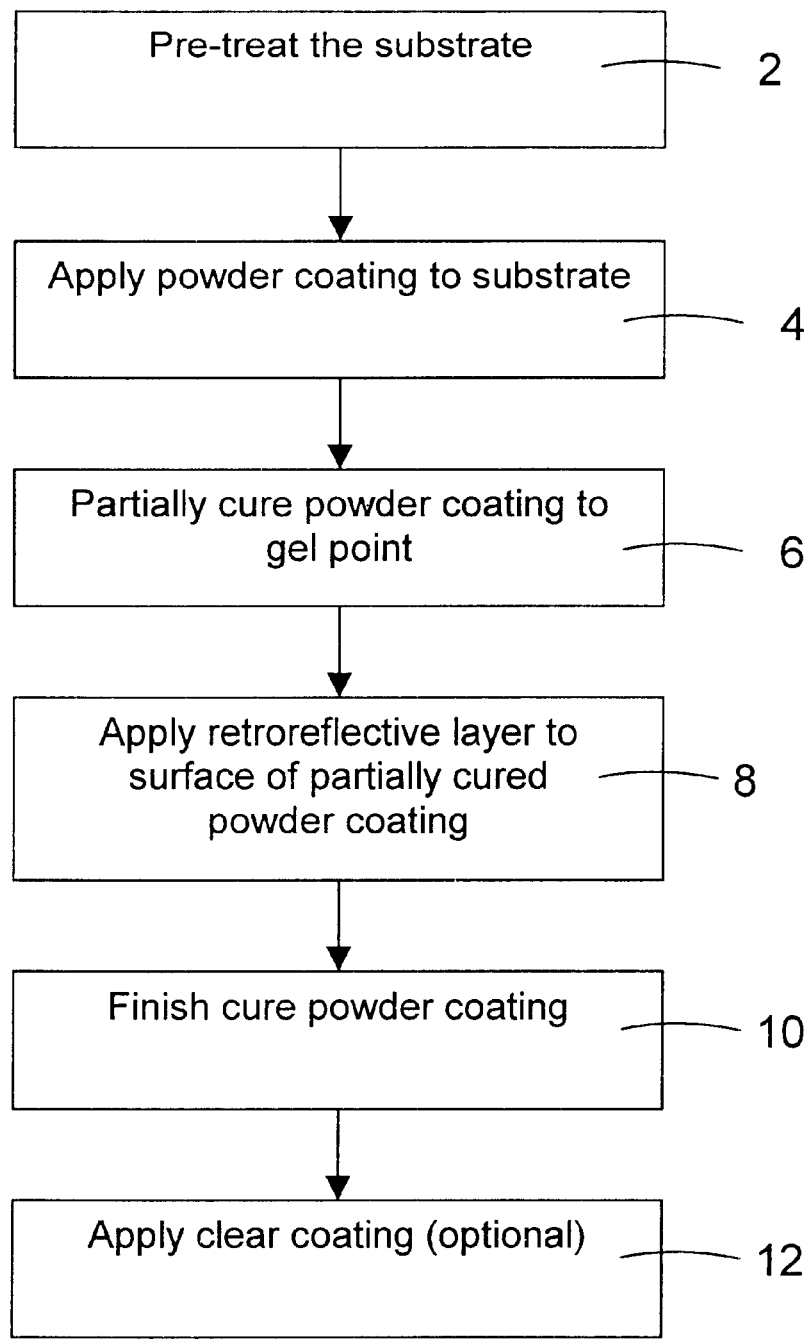
FIG. 1 is a flow chart of the process steps in a first embodiment of the present invention.

In a first embodiment of the present invention, a modified powder coating process is disclosed in which a reflective material is embedded in a powder coating binder on a substrate. The process finds particular usefulness in the manufacture of high visibility road signs, but is also applicable in any application in which an object must be visible from an extreme distance and/or at night.

Referring to FIG. 1, in a first step of the present invention, the substrate to be coated is pre-treated 2 to assure an optimum adhering surface for subsequently added layers. Due to the higher temperatures necessary to cure many traditional powder coatings, the substrate is typically metal or some other material capable of withstanding elevated temperatures. Thus, for ease of discussion, the invention will be described with the use of a metal substrate. It is important to note, however, that new powder coatings that cure at somewhat lower temperatures are now available, making the use of wood and other temperature sensitive materials as the substrate practical.

To maximize the adhesion, corrosion resistance and impact resistance of powder coatings, the substrate must be prepared so that the full quality of the powder-coated finish can be achieved. The pretreatment process generally consists of two distinct operations, cleaning and conversion coating. First, the substrate must be thoroughly cleaned. Cleaning is an important step in the powder coating process. The performance of the powder-coated finished product hinges directly on the quality of the cleaning. In fact, the degree of cleanliness required for powder coatings is generally higher than that required for liquid coatings. The substrate may be mechanically and/or chemically cleaned. Mechanical cleaning, such as sand blasting, air blasting or wire brushing, is not generally favored because these methods are labor intensive. Chemical cleaning is much more popular and can be accomplished in one or more of several methods known in the art, such as immersion, and power spray washing. Likewise, it is known in the art that many compounds may be used in chemical cleaning, each falling within one of three broad categories: alkalines, acids, and solvents. Alkaline chemical cleaners are the most popular and versatile.

The next operation in the pretreatment process for metal substrates is conversion coating. This operation is used to provide adhesion for the powder coating and corrosion resistance for the substrate. The three basic types of conversion coating are iron phosphatizing, zinc phosphatizing and chrome conversion coating. All three processes are known in the art and the choice of which process to utilize depends on cost, the composition of the substrate being coated, and the intended use of the finished product. Once the substrate has been conversion coated, the part may be rinsed and subsequently dried to remove any remaining contaminants.

With further reference to FIG. 1, after pretreatment, the substrate is powder coated 4 with a polymeric material. Different powders may be used to coat the substrate, depending on the application, the substrate, and the final properties desired in the finished powder coated product. Any conventional powder coating may be utilized in the present invention. These powder materials are available from various suppliers in assorted grades. Generally, for metal substrates, suitable powder coating materials include thermoplastics, thermosets, and mixtures thereof. Particular examples of suitable materials can be readily selected by those skilled in the art. Thermoplastics, such as nylon, polyethylene, polypropylene and polyvinyl chloride, are compounds that melt and flow under the application of heat but do not undergo any chemical change. Thus, they can be cooled and re-melted numerous times. Although sometimes used in the powder coating applications, thermoplastics are relatively expensive and tend to provide poor adhesion and protective properties compared to thermosets. For this reason, thermosets are a much more common type of powder coating.

Thermosets are compounds that will chemically crosslink (cure) under the application of heat. After cooling, thermosets will not re-melt when reheated once they are cured. Various types of thermosets may be used as the powder coating in the present invention including, but not limited to, acrylics, epoxies, polyesters, polyurethanes and various hybrids and combinations thereof. Suitable acrylic compounds include hydroxyl functional acrylics and glycidyl methacrylate acrylics (GMA). Epoxies are among the most prevalent powder coatings in the industry and exhibit good toughness and weather resistance. In addition, one or more different compounds can be combined to form a hybrid powder which may exhibit some or all of the properties of the individual components. In this way, a formulator can tailor the powder coating to provide the exact properties desired. Due to their popularity and for ease of description, the invention will be described using a thermoset material as the powder coating. Therefore, mention will be made in subsequent steps of the curing of the powder. As described above, however, the invention contemplates the use of a thermoplastic material as the powder coating as well.

Added to the thermoset or thermoplastic material can be a wide variety of other materials including, but not limited to, reinforcing fillers, extenders, pigments, processing aids, accelerators, cure agents, lubricants, coupling agents, plasticizers, preservatives, flow agents and other modifiers. These additional materials may be added in any concentration that does not adversely affect the properties of the cured powder coating.

There are several basic methods that may be used for applying the powder coating material to the substrate. The first application method is the use of an electrostatic spray. In this general method, powder is supplied through a delivery hose to a spray gun by air conveyance. The powder is electrostatically charged, either in the spray gun or at an electrode, and is deposited on a grounded substrate by means of a static charge. There are two common charging processes that may be used in spray coating: corona charging and triboelectric charging.

Corona charging applies an electric charge (usually negative) to the powder as it exits the spray gun. A high voltage power supply creates a concentrated charge at an electrode positioned at the tip of a spray gun, creating an electric field which causes the adjacent air to ionize and generate a corona, creating negative ions. As the powder particles pass through the corona field, they are bombarded by the negative ions of the corona, which transfer their charge to the powder particles.

Triboelectric charging is a method in which static electricity is generated by rubbing the powder particles against materials that readily accept electrons. As the powder particles move down the barrel of the gun, they rub against the interior of the gun barrel and transfer electrons to it. The positively charged powder particles then exit the gun and adhere to the surface of the substrate.

As an alternative to spray coating, the powder coating may be applied using a fluidized bed method. In this method, low pressure air or gas suspends the powder particles in a closed coating chamber, creating a cloud-like suspension of powder. When a preheated substrate is introduced into the chamber, the powder strikes the substrate, melting and clinging to the substrate's surface.

The thickness of the applied powder coating can be controlled to provide the results desired based on the particular application intended for the finished product. A typical powder coating thickness is from about 0.5 thousandths of an inch (0.5 mils) to about 50 mils. In spray coating techniques, controlling the thickness of the powder coating can be accomplished by varying the rate of flow out of the spray gun as well as the distance between the gun and the substrate to be coated. In fluidized bed coating techniques, the thickness of the powder is primarily controlled by varying the amount of time that the substrate is left in the coating chamber.

With further reference to FIG. 1, once the substrate has been coated to the desired thickness, it is heated 6 to above the melting temperature of the powder coating in order to melt and, in the case of thermoset powders, at least partially cure the coating. This heating can be accomplished by any method that provides acceptable results, such as convection heating or infrared or ultraviolet radiation.

Convection heating uses hot air to transfer heat from the energy source to the article being heated. The most common convection systems use a gas flame and blower to provide circulation of heated air in an oven chamber. Other convection systems utilize electric infrared elements which, while cleaner, are generally more expensive to operate. In convection heating, the entire object including the substrate must be brought to the cure temperature of the powder. If the substrate is large, it may take a substantial amount of time to fully heat, lengthening the time required to cure the powder coating. Since the entire oven chamber is heated evenly however, it is relatively easy to achieve consistent cure over the entire surface of even complex shaped objects.

Short wave, high-intensity infrared radiation provides a direct, radiant method of heating. Unlike convection heating, radiation heating does not require the medium to be heated for heat transfer to take place. Thus, since the air and substrate do not need to be heated, substantial savings in cure time may be realized. However, a direct line between the surface to be heated and the radiator is necessary for optimum and consistent results. Substrates with complex shapes may heat unevenly, resulting in uneven powder cure in various locations on the substrate surface. Radiation heating is best used with products of consistent and simple shape.

As stated previously, the powder coating is heated such that it melts and flows together, forming a continuous film on the substrate surface. The powder is heated to such a degree that it partially cures, forming a viscous fluid film in which a reflective material may be subsequently partially embedded. This partial curing is typically at the gel point of the powder. The temperature and length of time necessary to achieve this partial cure will vary depending on the identity of the powder coating. Thus, for an acrylic urethane powder coating, the partial cure step might include heating the powder coating for about 15 minutes at about 375° F.

With further reference to FIG. 1, as the partially cured powder coated substrate exits from the heating chamber, and while it is still hot, a retroreflective layer is applied 8 to the surface of the substrate on top of the partially cured powder. The retroreflective layer comprises a reflective material. The powder coating should be sufficiently tacky or gelled such that the reflective material easily adheres thereto. The reflective material can be applied in any manner such that it partially embeds in the partially cured powder and bonds thereto. In one embodiment, the reflective material is embedded in the partially cured powder such that at least a part of the upper surface of the reflective material is exposed to the atmosphere, thereby forming a retroreflective layer and better permitting retroreflection of incident light by the final product.

Various known reflective materials can be utilized in forming the retroreflective layer according to the process described herein. Reflective materials include, but are not limited to, glasses, ceramics, metals, plastics and other similar types of reflective materials known in the art. In one embodiment, the reflective material comprises numerous distinct reflective optical elements. These optical elements are generally small grains or particles that act as lenses to diffract and reflect incident light.

The reflective optical elements can be any desired shape, such as triangular, square, pentagonal, hexagonal, etc. In one embodiment, the reflective elements are substantially spherical. Such spherical reflective elements are known in the art as microspheres.

A wide variety of ceramic optical elements (e.g. microsphere) may be employed in the present invention. Typically, for optimal retroreflective effect, the optical elements have a refractive index of about 1.5 to about 2.6. Generally, optical elements of about 50 to about 1000 micrometers in diameter may be suitably employed. In one embodiment, the optical elements used have a relatively narrow size distribution for effective coating and optical efficiency.

The optical elements may comprise an amorphous phase, a crystalline phase, or a combination, as desired. Also, the optical elements may be comprised of inorganic materials that are not readily susceptible to abrasion. Suitable optical elements include microspheres formed of glass having indices of refraction of greater than about 1.5 and typically from about 1.5 to about 1.9. The optical elements most widely used are made of soda-lime-silicate glasses. Although the durability is acceptable, the refractive index is only about 1.5, which greatly limits their retroreflective brightness. Higher-index glass optical elements of improved durability that can be used herein are taught in U.S. Pat. No. 4,367,919.

When glass elements are used, the fabrication of the retroreflective layer occurs at temperatures below the softening temperature of the glass optical elements, so that the optical elements do not lose their shape or otherwise degrade. The optical elements' softening temperature, or the temperature at which the glass flows, generally should be greater than the process temperature used to form the retro-reflective layer. This is typically about 100° C. to about 200° C. above the process temperature used to form the retro-reflective layer.

The optical elements can be colored to match the binder (e.g. marking paints) in which they are embedded. Techniques to prepare colored ceramic optical elements that can be used herein are described in U.S. Pat. No. 4,564,556. Colorants such as ferric nitrate (for red or orange) may be added in the amount of about 1 to about 5 weight percent of the total metal oxide present. Color may also be imparted by the interaction of two colorless compounds under certain processing conditions (e.g. $TiO_2$ and $ZrO_2$ may interact to produce a yellow color). Further, a pigmented translucent layer may also be used to impart a color to the finished product.

Other materials may be included within the retroreflective layer. These may be materials added to the optical elements during preparation, added to the optical elements by the supplier, and/or added to the retroreflective layer during coating with the optical elements. Illustrative examples of such materials include pigments and skid-resistant particles.

Pigments may be added to the optical elements to produce a colored retroreflective element. In particular, yellow may be desirable for yellow pavement markings. For example, praseodymium doped zircon $((Zr, Pr)SiO_4)$ and $Fe_2O_3$ or NiO in combination with $TiO_2$ may be added to provide a yellow color to better match aesthetically a yellow liquid pavement marking often used in centerlines. Cobalt zinc silicate $((Co, Zn)_2SiO_4)$ may be added to match a blue colored marking. Colored glazes or porcelain enamels may also be purchased commercially to impart color, for example yellow or blue.

Pigments which enhance the optical behavior may be added. For example, when neodymium oxide $(Nd_2O_3)$ or neodymium titanate $(Nd_2TiO_5)$ is added, the perceived color depends on the spectrum of the illuminating light.

Skid-resistant particles may be substituted for some of the optical elements. They are useful on retroreflective and non-retroreflective pavement markings to reduce slipping by pedestrians, bicycles, and motor vehicles. The skid-resistant particles can be, for example, ceramics such as quartz, aluminum oxide, silicon carbide or other abrasive media. Preferred skid-resistant particles include fired ceramic spheroids having a high alumina content as taught in U.S. Pat. Nos. 4,937,127; 5,053,253; 5,094,902; and 5,124,178, the disclosures of which are incorporated herein by reference. Skid-resistant particles typically have sizes ranging from about 200 to about 800 micrometers.

The optical elements can be applied to the partially cured powder coating by any effective means. A pneumatic or hydraulic powered dispensing machine can be used to deposit the optical elements on the powder coating. The optical elements should be deposited with such a velocity that the optical elements are partially embedded in the powder coating with at least a portion of the surface of a sufficient number of optical elements still exposed to provide the desired retroreflectivity to the finished article. Pressure may be applied to the optical elements after they have been deposited to assure that they are securely embedded in the powder coating.

Referring further to FIG. 1, once the retroreflective layer is deposited on the partially cured powder coating, the resulting assembly is heated 10 to completely cure the powder coating. This allows the thermoset to fully crosslink and reach is maximum toughness and durability. This finishing cure step also bonds the retroreflective layer to the cured powder coating, securing the two together more tightly and making the optical elements less likely to become dislodged. Again, the temperature and length of time necessary for final curing will depend on the identity and thickness of the powder coating.

Optionally, an additional clear coating may be applied 12 after the powder coating is fully cured. This coating may be added to provide protection for the retroreflective layer and inhibit the dislocation of optical elements. This coating may comprise any clear material that does not unduly affect the retroreflective properties of the product.

The following example illustrates the process of the present invention without intending to limit the scope of the invention.

EXAMPLE 1

A smooth finish steel panel having the following properties was obtained:

| | |
|---|---|
| Size: | 4 in. × 6 in. |
| Thickness: | 0.020 in. (0.8 mm) |
| Finish: | Smooth |
| Roughness: | <20 micro inches |

-continued

| | |
|---|---|
| ASTM Spec: | A366; D609 type 3 |
| Federal Steel Spec | QQ - S - 698 |
| Hardness: | B50-B65 |
| Tensile (psi): | 54,000 |
| Chemical Composition: | SAE - 1008/1010 (nominal %) |
| Element %: | Manganese 0.025–0.060% |
| | Carbon 0.130% max. |
| | Phosphorous 0.040% max. |
| | Sulphur 0.050% max. |

The steel panel was then cleaned using an alkaline cleaning method according to ASTM D609. A powder coating comprising a chrome polyester powder (23-9080 Corvel®) was then applied to the cleaned steel panel. The powder coated panel was then partially cured at 350° C. for 30–60 sec. in an infrared batch oven to the gel point of the chrome polyester powder. A retroreflective layer of glass spheres was then applied to the partially cured powder layer. The glass spheres were of the following type (obtained from Potters Industries, Inc., Valley Forge, Pa.):

| | |
|---|---|
| Type: | I. R. Solid Glass Spheres |
| Refractive Index: | 1.90 to 1.93 (Cargille) |
| Specific Gravity: | 4.0 to 4.5 |
| Bulk Density: | 150 lbs./ft$^3$ |
| Softening Temp.: | >1,000° C. |
| Free Crystalline Silica: | None |
| Oil Absorption: | Approx. 16 g. oil/100 g. spheres |
| Air Inclusions: | Max. 10% |
| Opaque Spheres: | Max 10% |
| Roundness: | >90% True Spheres |
| Appearance: | White in color |
| Size range: | T-4; U.S. Seive 270 (90–100%) |

The powder coating having the glass beads thereon was then finish cured at 350° C. for 10–15 min. in an infrared batch oven. A translucent coating was then applied using Translucent Blue Polyester (23-9370 Corvel ) at 350° C. to 375° C. for 10–15 min. to form the finished product.

The end products for which the coating process can be utilized include any known product for which dry powder coating is typically utilized. Such products include, but are not limited to, highway signs, roadside safety products, auto parts (cars, motorcycles, trucks, buses, etc.), bicycles, railroad cars, railroad signs and crossing gates, loading and freight dock markings, airport runways, parking lots and garages, and virtually anywhere light delineation is needed.

Various modifications and alterations of this invention will become apparent to those skilled in the art without departing from the scope and spirit of this invention. It should be readily understood that this invention contemplates these modifications and is not to be unduly limited to the illustrative embodiments set forth herein.

What is claimed is:

1. A process for forming a retroreflective surface on a substrate consisting of:
   providing a powder coating material;
   pretreating the substrate;
   applying the powder coating material to an outer surface of the substrate; partially curing the powder coating such that it becomes tacky or gelled;
   providing a reflective material;
   applying a retroreflective layer on the surface of the powder coating by at least partially embedding the reflective material in the partially cured powder coating; and
   finish curing the powder coating.

2. The process according to claim 1, wherein the step of providing a powder coating is performed by providing a thermoset or thermoplastic polymer.

3. The process according to claim 1, wherein the step of providing a reflective material is performed by providing a plurality of ceramic optical elements.

4. The process according to claim 3, wherein the ceramic optical elements are microspheres.

5. The process according to claim 4, wherein the microspheres are barium titanate glass beads.

6. The process according to claim 4, wherein the microspheres have a refractive index of at least about 1.5.

7. The process according to claim 6, wherein the refractive index is about 1.9.

8. The process according to claim 3, wherein the ceramic optical elements have a particle size of from about 50 to about 1000 micrometers in diameter.

9. The process according to claim 1, wherein the step of applying the powder coating material to an outer surface of the substrate is performed by electrostatically spray coating the powder coating material on the substrate.

10. The process according to claim 1, wherein the step of applying the powder coating material to an outer surface of the substrate is performed by positioning the substrate in a fluidized bed of the powder coating material.

11. The process according to claim 1, wherein the pretreating the substrate step is performed by the steps of cleaning the substrate and conversion coating the substrate prior to applying the powder coating to the outer surface of the substrate.

12. The process according to claim 1, wherein the steps of partially curing the powder coating and finish curing the powder coating are performed by heating the powder coating using a convection heating system.

13. The process according to claim 1, wherein the steps of partially curing the powder coating and finish curing the powder coating are performed by heating the powder coating using infrared or ultraviolet radiation.

14. The process according to claim 1, wherein the step of partially curing the powder coating comprises curing the powder to the gel point of the powder.

15. A process for forming a retroreflective surface on a substrate, the process consisting of:
   providing a thermoset powder coating material;
   pretreating the substrate by cleaning and conversion coating the substrate;
   applying the thermoset powder coating material to the substrate by electrostatic spray or fluidized bed coating;
   partially curing the thermoset powder to the gel point of the powder;
   applying reflective ceramic optical elements to the partially cured thermoset powder coating;
   finish curing the thermoset powder coating to form a retroreflective surface on the substrate; and
   applying a clear coat to the retroreflective surface.

16. The process according to claim 15, wherein the ceramic optical elements are barium titanate glass microspheres.

17. The process according to claim 15, wherein the ceramic optical elements have a refractive index of from about 1.5 to about 2.6.

* * * * *